United States Patent [19]

Yun et al.

[11] Patent Number: 5,742,413
[45] Date of Patent: Apr. 21, 1998

[54] CIRCUIT OF DUPLEXING SUPERVISORY CONTROL MODULES FOR USE IN A DATA TRANSMISSION SYSTEM

[75] Inventors: Il-Hyunk Yun; Jae-Joon Lee, both of Gumi, Rep. of Korea

[73] Assignee: SamSung Electronics Co., Ltd., Suwon, Rep. of Korea

[21] Appl. No.: 655,194

[22] Filed: May 28, 1996

[30] Foreign Application Priority Data

May 27, 1995 [KR] Rep. of Korea ............... 133559/1995

[51] Int. Cl.$^6$ ........................................... H04B 10/08
[52] U.S. Cl. ..................... 359/110; 359/113; 359/118; 359/167; 371/20.1
[58] Field of Search ........................ 359/110, 113, 359/115, 118, 143, 167; 370/216, 242, 244, 522; 371/20.1; 379/14

[56] References Cited

U.S. PATENT DOCUMENTS

| | | | |
|---|---|---|---|
| 4,829,596 | 5/1989 | Barina | 455/612 |
| 4,833,668 | 5/1989 | Rowley et al. | 359/113 |
| 5,347,384 | 9/1994 | McReynolds et al. | 359/152 |
| 5,416,623 | 5/1995 | Dawson et al. | 359/110 |
| 5,442,472 | 8/1995 | Skrobko | 359/110 |
| 5,546,325 | 8/1996 | Aulet et al. | 359/110 |

*Primary Examiner*—Kinfe-Michael Negash
*Attorney, Agent, or Firm*—Robert E. Bushnell, Esq.

[57] ABSTRACT

A circuit of duplexing supervisory modules for use in a data transmission system having an optical fiber system, a multiplexer/demultiplexer system, a work station and a personal computer has a primary information collection supervisory circuit connected to the first and second optical fiber systems, for collecting primary information relating to a local site; a secondary information collection supervisory circuit doubly connected to the primary information collection supervisory circuit, for collecting secondary information in dependence upon the first information; and a tertiary information collection supervisory circuit connected to the work station and doubly connected to the secondary information collection supervisory circuit, for collecting tertiary information in dependence upon the secondary information and providing tertiary information to the work station.

15 Claims, 3 Drawing Sheets

(CONVENTIONAL DATA TRANSMISSION SYSTEM)

5,742,413

CIRCUIT OF DUPLEXING SUPERVISORY CONTROL MODULES FOR USE IN A DATA TRANSMISSION SYSTEM

CROSS-REFERENCE TO RELATED APPLICATION

This application makes reference to, incorporates the same herein, and claims all benefits accruing under 35 U.S.C. §119 from an application for Circuit Of Duplexing Supervisory Control Modules For Use In A Data Transmission System earlier filed in the Korean Industrial Property Office on the 27th of May 1995, and there duly assigned Ser. No. 13559/1995.

BACKGROUND OF THE INVENTION

1. Technical Field

The present invention relates to circuits of duplexing supervisory control modules for use in a data transmission system, and more particularly to circuits of duplexing supervisory control modules for use in a data transmission system connected to an exchange network for reliably transmitting information data even when there is an error in a communication link of the data transmission system.

2. Background Art

Generally, conventional data transmission system connected to an exchange network for transmitting information data to a remote transmission system through the exchange network and for receiving information data from the remote transmission system through the exchange network such as those adopted by the Conference of European Postal and Telecommunications (CEPT) is commonly available for an operator to communicate with a remote site through the exchange network with a work station and a personal computer. Data information from the CEPT type of data transmission system is typically generated from a work station to the exchange network through one or various items of parallelly connected communication link devices such as a multiplexer/demultiplexer, an optical fiber system and a microwave system. Should any transmission error occur, the multiplexer/demultiplexer, the optical fiber system and the microwave system each detects such a transmission error and transmits transmission error data back to the work station through the personal computer at which point the operator can monitor and manipulate the correction of such transmission error.

In the CEPT type of data transmission system however, we have observed that if the cable link connected to the personal computer, the multiplexer/demultiplexer, the optical fiber system and the microwave system is abnormal, transmission error detected by one of the multiplexer/demultiplexer, the optical fiber system and the microwave system can not be transmitted to the work station. This, in turn, results in poor transmission of information data through an exchange network.

SUMMARY OF THE INVENTION

Accordingly, it is therefore an object of the present invention to provide an improved process and circuit for transmission of data.

It is another object to provide a process and circuit capable of transmitting data even after the occurrence of errors in a linking device.

It is still another object to provide a process and circuit compensating for errors during data transmission via a linking device, by duplexing information collection supervisory devices.

These and other objects may be achieved with a circuit for duplexing supervisory modules in a data transmission system having an optical fiber system, a multiplexer/demultiplexer system, a work station and a processor such as a personal computer serving as a primary information collection supervisory circuit connected to the optical fiber system and the multiplexer/demultiplexer system, for collecting primary information relating to a local site. A secondary information collection supervisory circuit is doubly connected to the primary information collection supervisory circuit to collect secondary information in response to the primary information, and a tertiary information collection supervisory circuit is connected to the work station and is also doubly connected to the secondary information collection supervisory circuit, for collectling tertiary information in response to the secondary information and providing the tertiary information to the work station.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
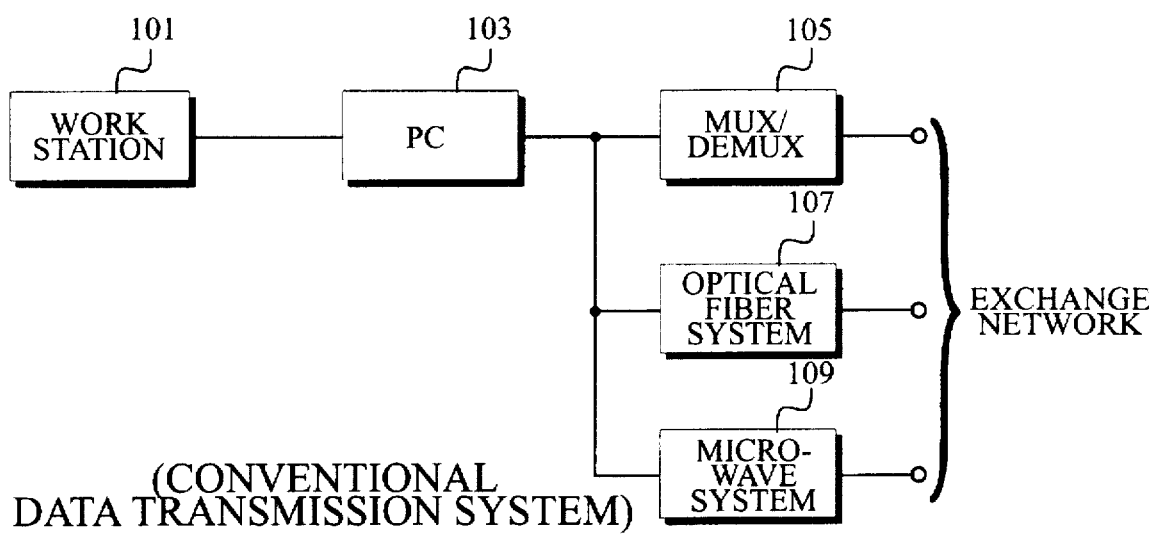
FIG. 1 is a block diagram illustrating a salient features of a simplified, hypothetical representation of a conventional data transmission system.

Referring now to the drawings and particularly to FIG. 1, which illustrates a conventional CEPT type of data transmission system. As shown in FIG. 1, the conventional data transmission system includes a work station 101 and a personal computer 103 connected to each of a multiplexer/demultiplexer 105, an optical fiber system 107 and a microwave system 109 from which an exchange network is linked for enabling an operator to communicate with a remote site. In such a conventional data transmission system of FIG. 1, subscriber data is transmitted from the work station 101 under supervision of the personal computer 103 through one of the multiplexer/demultiplexer system 105, the optical fiber system 107 and the microwave system 109 to the exchange network.

The multiplexer/demultiplexer system 105 serves to multiplex information data generated from the work station 101 into a suitable format for transmission through the exchange network, and to demultiplex information data received from the exchange network into a suitable format for communication with the work station 101. Similarly, the optical fiber system 107 serves as an optical transmission system for converting information data generated from the work station 101 into an optical signal containing information data for transmission through the exchange network, and an optical reception system for convening an optical signal received from the exchange network into information data suitable for communication with the work station 101. The microwave system 109, on the other hand, serves to transmit information data generated from the work station 101 to the exchange network by way of microwave and to convert a microwave signal received from the exchange network into a suitable format for communication with the work station 101. Each of the multiplexer/demultiplexer system 105, the optical fiber system 107 and the microwave system 109 includes circuitry for detecting the transmission error and transmitting transmission error data back to the work station through the personal computer for signal transmission assurance.

As established earlier, such a CEPT type of data transmission system, we have observed that if the cable link connected to the personal computer 103, the multiplexer/demultiplexer 105, the optical fiber system 107 and the microwave system 109 is abnormal, transmission error detected by any one of the multiplexer/demultiplexer system 105, the optical fiber system 107 and the microwave system 109 can not be transmitted to the work station 101. Consequently, this lack of transmission error results in poor transmission of information data.

Figure 2:
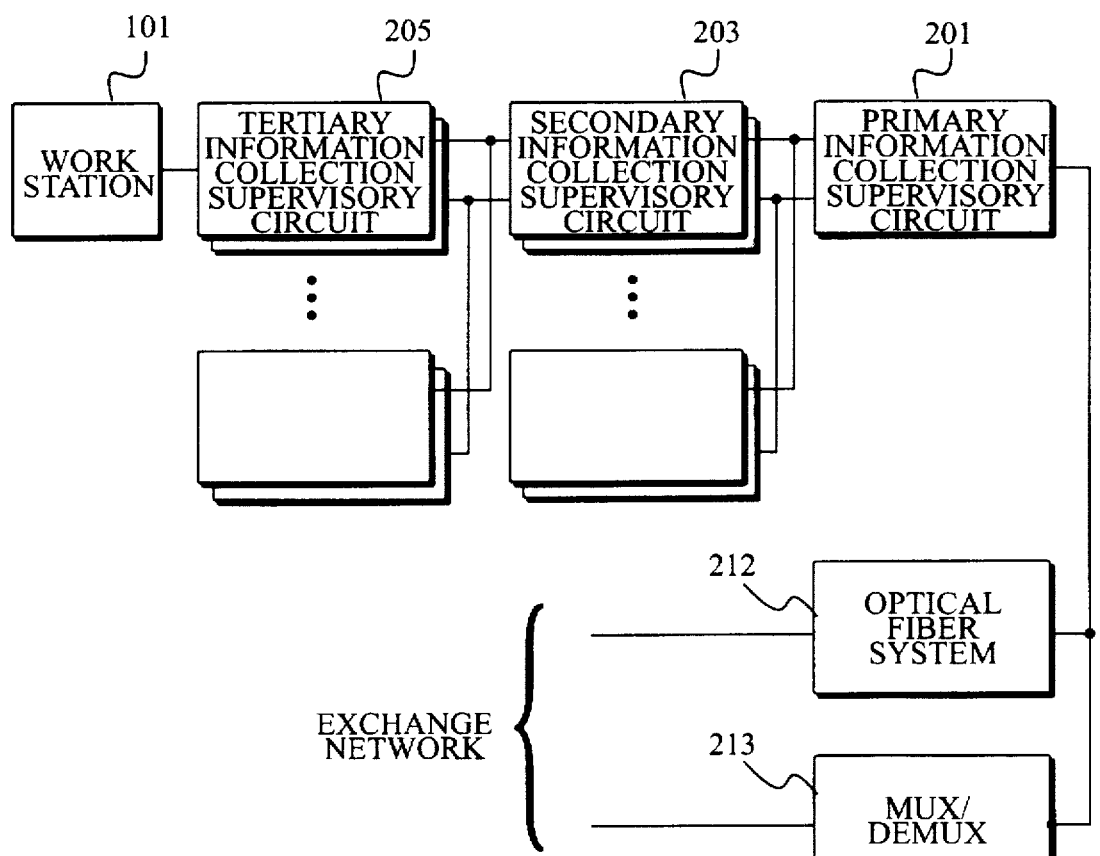
FIG. 2 is a block diagram illustrating a data transmission system constructed according to the principles of the present invention.

Turning now to FIG. 2 which illustrates a data transmission system constructed according to the principles of the present invention. In FIG. 2, the data transmission system includes a work station 101, an optical fiber system 212 and a multiplexer/demultiplexer system 213, a primary information collection supervisory circuit 201 connected to the first and second optical fiber systems 212 and 213, for collecting only primary information of the local site, i.e., various alarm signals detected from the optical fiber system 212 such as "lock out", "switch", "AIS", "BER" and "loopback", and alarm signals detected from the multiplexer/demultiplexer system 213 such as "loopback", "no input", "lock out", "switch", "loss of frame" etc. which indicate whether such an optical fiber system 212 and such a multiplexer/demultiplexer 213 are "in-service" or "out-of-service", a secondary information collection supervisory circuit 203 doubly connected to the primary information collection supervisory circuit 201, for collecting secondary information, i.e., sixty four (64) items of information of the primary information collection supervisory circuit at its maximum, and a tertiary information collection supervisory circuit 205 connected to the work station 101 and doubly connected to the secondary information collection supervisory circuit 203, for collecting tertiary information, i.e., eight (8) items of information of the secondary information collection supervisory circuit at its maximum and then providing the tertiary information to the work station 101. The information collection supervisory circuits 201, 203 and 205 are used in lieu of a personal computer to supervise the transmission of error data to the work station 101 so that, even if the cable linked between the work station 101 and for example, the optical fiber system 212 and the multiplexer/demultiplexer system 213 as shown in FIG. 2 is abnormal, transmission error data can still be transmitted to the work station 101 for data transmission assurance.

Figure 3:
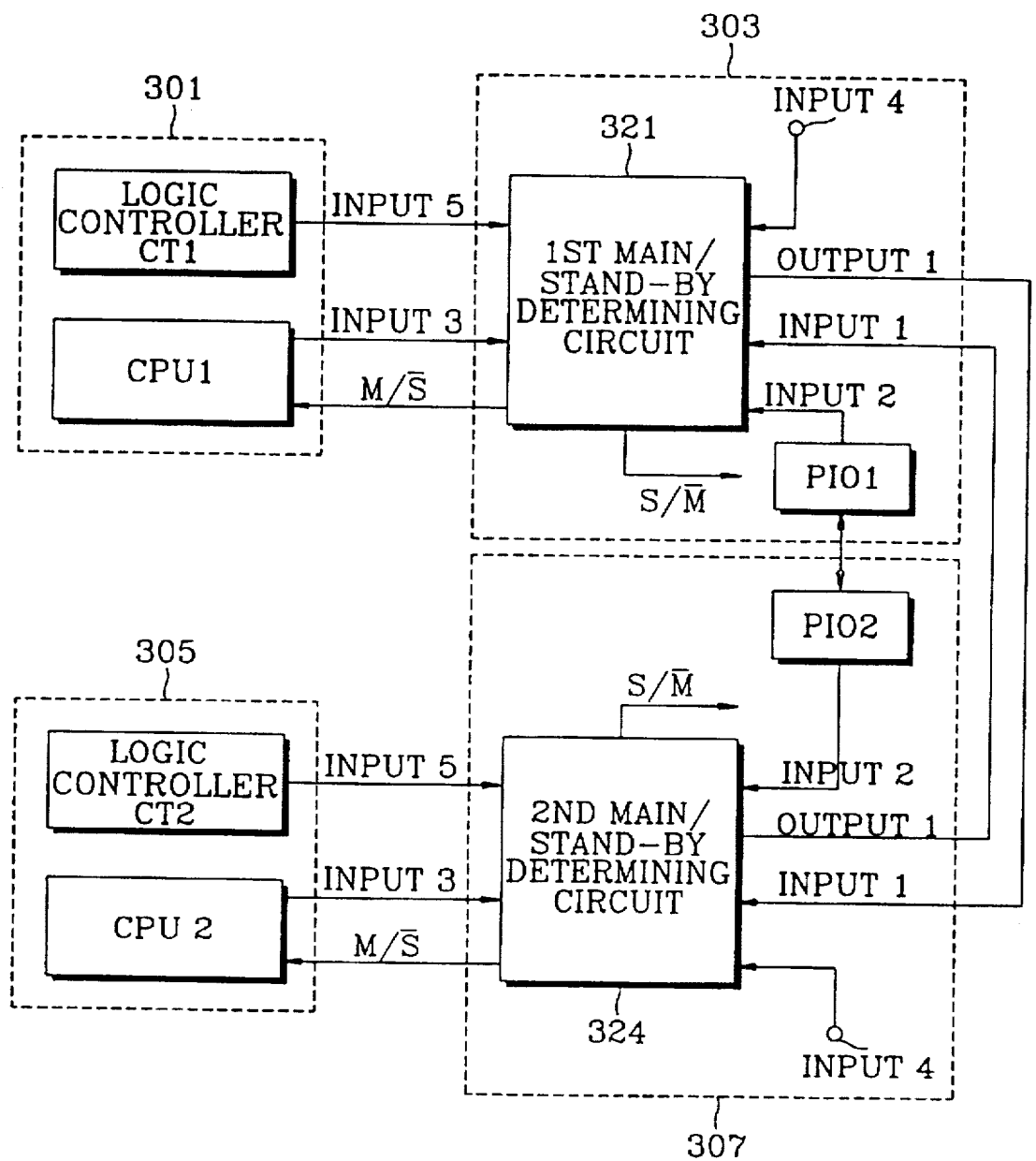
FIG. 3 is a detailed circuit diagram illustrating one of secondary and tertiary information collection supervisory circuits shown in FIG. 2.

FIG. 3 is a detailed circuit diagram illustrating any one of secondary and tertiary information collection supervisory circuits shown in FIG. 2. The primary information collection supervisory circuit 201 however does not include duplexed transmission paths. By contrast, the secondary and tertiary information collection supervisory circuits 203 and 205 include duplexed transmission paths so that, even if there occurs any transmission error in any one of the transmission paths, transmission error data can still be transmitted through different paths. As shown in FIG. 3, a typical information collection supervisory circuit constructed for the secondary and tertiary information collection supervisory circuits having duplexed transmission paths as contemplated by the present invention includes a first and second processor units 301 and 305 and a first and second I/O boards 303 and 307 connected in parallel for supervising information data received thereto and for requesting a switching of a different transmission path if there occurs any transmission error in the data transmission system.

The first processor unit 301 includes a first logic controller CT1 and a first central processing unit CPU1 and is connected to the first I/O board 303 for supervising a signal output from the first I/O board 303 and initiating the request for switching if there occurs any transmission error. Similarly, the second processor unit 305 includes a second logic controller CT2 and a second central processing unit CPU2 and is connected to the second I/O board 307 for supervising a signal output from the second I/O board 307 and initiating the request for switching if there occurs any transmission error. The first and second I/O boards 303 and 307 include a first and second main/stand-by determining circuits 321 and 324 and a first and second parallel I/O circuits PIO1 and PIO2, respectively. Both I/O boards 303 and 307 serve to supervise information data received thereto from a preceeding device. For example, if FIG. 3 represents a tertiary information collection supervisory circuit 205 as shown in FIG. 2, then the information data is received from the work station 101. If, however, FIG. 3 represents either a secondary or a primary information collection supervisory circuit, the information data is received from a succeeding supervisory circuit. Information regarding the local site such as a transmission error having occurred in the cable link, however, is collected by the primary collection supervisory circuit, and is transmitted to the work station 101 through its serially connected preceeding supervisory circuits including the secondary and tertiary information collection supervisory circuits 203 and 205. The first and second parallel I/O circuits PIO1 and PIO2 are connected each other between the first and second main/stand-by determining circuits 321 and 324, and the first and second main/stand-by determining circuits 321 and 324 perform data communication through the first and second parallel I/O circuits PIO1 and PIO2.

Figure 4:
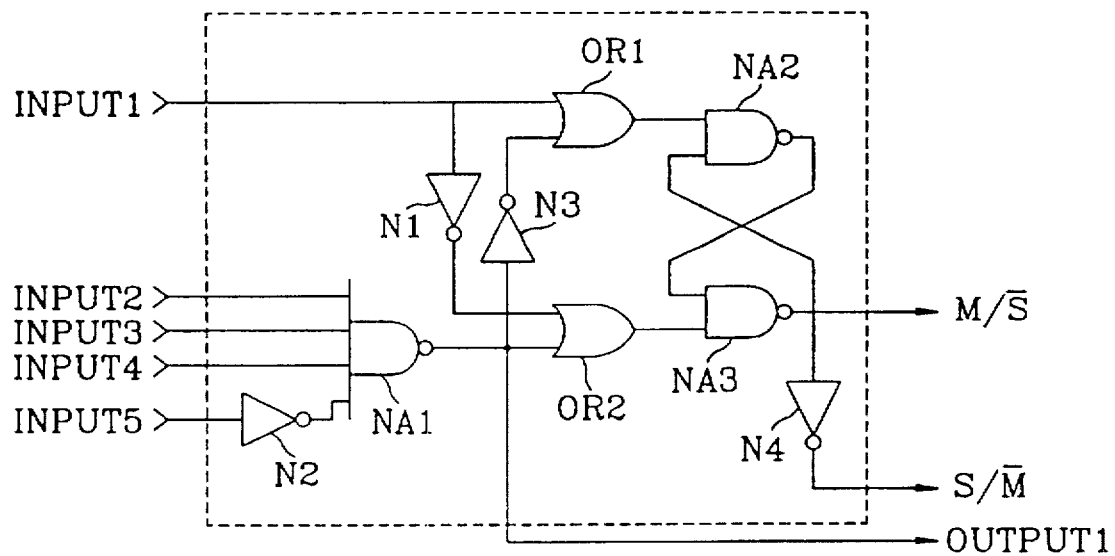
FIG. 4 is a detailed circuit diagram illustrating one of first and second main/stand-by determining circuits shown in FIG. 3.

FIG. 4 is a detailed circuit diagram illustrating one of the first and second main/stand-by determining circuits in FIG. 3. In FIG. 4, a first input terminal INPUT1 is connected to a first inverter N1 and to an input terminal of a first OR gate OR1, second to fourth input terminals INPUT2, INPUT3, INPUT4 are connected to an input terminal of a first NAND gate NA1, and a fifth input terminal INPUT5 is connected to the input terminal of the first NAND gate NA1 through a second inverter N2. An output terminal of the first NAND gate NA1 is connected to a third inverter N3 and an input terminal of a second OR gate OR2 and to an output terminal OUTPUT1 of the main/stand-by determining circuit. The outputs of the first and third inverters N1 and N3 are connected to input terminals of the first and second OR gates OR1 and OR2, and the outputs of the first and second OR gates OR1 and OR2 are latched at the second and third NAND gates NA2 and NA3. The latched outputs represents a main/stand-by signal M/S and a stand-by/main signal S/M each serves to inform whether the main/stand-by determining circuit is in a main state or in a stand-by state with respect to the other main/stand-by determining circuit. The main state refers to when there is no transmission error having occurred in the transmission path with a preceeding or upper device and a succeeding or lower device. For example, if the main/stand-by determining circuit of a tertiary information collection supervisory circuit 205 is in a main state, then there is no transmission error having occurred in the transmission path between the work station 101 and the secondary information collection supervisory circuit 203. Similarly, if the main/stand-by determining circuit of a secondary information collection supervisory circuit 203 is in a main state, there is no transmission error having occurred in the transmission path between the tertiary information collection supervisory circuit 205 and the primary information collection supervisory circuit 201. By contrast, however, if the main/stand-by determining circuit of, for example, the second information collection supervisory circuit 203 is in a stand-by state, then there is transmission error having occurred in a particular transmission path between the tertiary information collection supervisory circuit 205 and the primary information collection supervisory circuit 201. Since the secondary and tertiary information collection supervisory circuits 203 and 205 include duplexed transmission paths, the transmission error having occurred in any one transmission path can be transmitted through a different transmission path without interrupting the continuity of the data information transmission.

Figure 5:
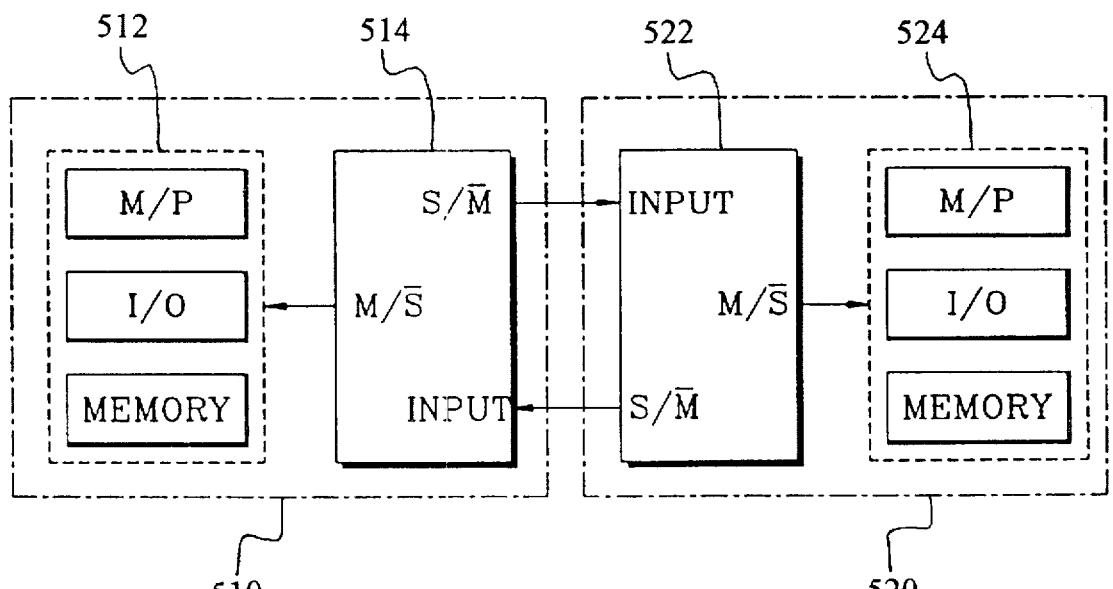
FIG. 5 is an abstract diagram illustrating one of first and second main/stand-by determining circuits shown in FIG. 4.

FIG. 5 is an abstract diagram illustrating one of the secondary and tertiary information collection supervisory circuits 203 and 205 shown in FIG. 2. Assuming that FIG. 5 relates to the secondary information collection supervisory circuit 203, such a secondary information collection supervisory circuit 203 includes two information modules 510 and 520. If one information module 510 is in a main state, the other information module 520 is in a stand-by state. The first module 510 contains a logic circuit 514 comprising therein a main/stand-by determining circuit as shown in FIG. 4 and a processor unit 512 comprising therein a micro-processor M/P, I/O device and memory. Similarly, the second module 520 contains a complementary logic circuit 522 comprising therein a corresponding main/stand-by determining circuit as shown in FIG. 4 and a processor unit 524 comprising therein a micro-processor M/P, I/O device and memory. If the logic circuit 514 of the first module 510 changes from the main state to the stand-by state by the INPUT 1-5 as shown in FIG. 4, the logic circuit 514 transfers a switching request signal to I/O device of the processor unit 512 to the complementary logic circuit 522 of the second module 520. The second module 520 which is in a stand-by state, changes to a main state, and the first module 510 changes to the stand-by state.

A preferred embodiment of the present invention will be described in detail with reference to FIGS. 2 to 5.

With the duplex of the secondary and tertiary information collection supervisory circuits 203 and 205, it is possible to determine whether to enter a main state or to a stand-by state by the inputs of the first to fifth input terminals INPUT1 to INPUT5 of FIG. 5 without interference of the more significant level work station 101. As shown in FIG. 4, the input terminal INPUT1 of one main/stand-by determining circuit of each of the secondary and tertiary information collection supervisory circuits 203 and 205 is connected to the output terminal of the other main/stand-by determining circuit. The signal generated from the other main/stand-by determining circuit is input into the input terminal INPUT1, and then is applied to the first OR gate OR1 and first inverter N1. The input terminal INPUT2 receives information regarding to the main/stand-by signal M/S and the stand-by/mean signal S/M generated from the other main/stand-by determining circuit through the first and second parallel I/O circuits PIO1 and PIO2. The input terminal INPUT3 receives a compulsory switching signal from the central processing unit (CPU). The input terminal INPUT4 receives a H/W fault detection signal generated by an H/W fault such as a power on/off or a reset switch push from the I/O board. If the I/O board operates abnormally, i.e., when the I/O board is "out-of-service" in response to an occurrence of the H/W fault, the signal of the input terminal INPUT4 goes from logic "high" level to logic "low" level. The signal of the input terminal INPUT5 is generated by the logic controller in the processor unit. The first NAND gate NA1 receives the signal of the input terminal INPUT2, the compulsory switching signal of the input terminal INPUT3, the H/W fault signal of the input terminal INPUT4 and the signal of the input terminal INPUT5 through a second inverter N2. The output of the first NAND gate NA1 is applied to the other main/stand-by determining circuit through the third inverter N3, second OR gate OR2 and output terminal OUTPUT1. The signal of the input terminal INPUT1 and the output signal of the first NAND gate NA1 are inverted through the first and third inverters N1 and N3, respectively and then are applied to the second and first OR gates OR2 and OR1. The outputs of the first and second OR gates OR1 and OR2 are latched at a latch circuit composed of second and third NAND gates NA2 and NA3, and then output as a main/stand-by signal M/S This signal is applied to the other main/stand-by determining circuit through the first and second parallel I/O circuits PIO1 and PIO2.

As can be seen in FIG. 5, the main/stand-by signal M/S generated by one of the secondary and tertiary information collection supervisory circuits 203 and 205 is applied to its own I/O board or its own central processing unit of the processor unit in order to support the main/stand-by determining circuit to maintain its present state. The stand-by/mean signal S/M which has been passed through the inverter N4 is applied to an input of the other main/stand-by determining circuit in order to enable the other main/stand-by determining circuit to determine whether to enter a main state or a stand-by state.

As described above, with the duplex of communication link and of information collection supervisory devices, it is possible to enhance the performance and reliability of the data transmission system. While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A circuit for duplexing supervisory modules for use in a data transmission system, comprising:

a work station;

an optical fiber system and a multiplexer/demultiplexer system connected to an exchange network for enabling an operator to communicate from the work station with a remote data transmission system connected to the exchange network;

a primary information collection supervisory circuit connected to said optical fiber system and said multiplexer/demultiplexer system, for collecting primary information of a local site;

a secondary information collection supervisory circuit doubly connected to said primary information collection supervisory circuit, for collecting secondary information in dependence upon said first information; and a tertiary information collection supervisory circuit connected to said work station and doubly connected to said secondary information collection supervisory circuit, for collecting tertiary information in dependence upon said secondary information and providing said tertiary information to said work station.

2. The circuit of claim 1, further comprised of each of said secondary and tertiary information collection supervisory circuits comprising:

a first processor unit having a first logic controller and a first central processing unit;

a second processor unit having a second logic controller and a second central processing unit;

a first input/output board connected to said first processor unit, and including a first main/stand-by determining circuit and a first parallel input/output circuit; and a second input/output board connected to said second processor unit, and including a second main/stand-by determining circuit and a second parallel input/output circuit, said first and second parallel input/output circuits being connected each other, said first and second main/stand-by determining circuits performing data communication through said first and second parallel input/output circuits.

3. The circuit of claim 2, further comprised of said first main/stand-by determining circuit comprising:

a first inverter for providing a first inverted signal by inverting an output signal received from the second main/stand-by determining circuit;

a second inverter for providing a second inverted signal by inverting a control signal received from the first logic controller;

a first logic gate for generating a first logic signal by logically combining a compulsory switching signal received from the first central processing unit, one of a main/stand-by signal and a stand-by/main signal received from the second main/stand-by determining circuit, and a fault detection signal indicative of whether there is an error occurred in a transmission path;

a third inverter for providing a third inverted signal by inverting said first logic signal;

a second logic gate for generating a second logic signal by logically combining said output signal received from the second main/stand-by determining circuit and said third inverted signal;

a third logic gate for generating a third logic signal by logically combining said first inverted signal and said third inverted signal; and means coupled to receive said second and third logic signals, for generating a main/stand-by signal indicative of whether said first main/stand-by determining circuit is in one of a main state where there is no error in the transmission path and a standby state where there is an error in the transmission path.

4. The circuit of claim 3, further comprised of said first logic gate corresponding to a NAND gate, and said second and third logic gates each corresponding to an OR gate.

5. The circuit of claim 4, further comprised of said means for generating said main/stand-by signal comprising a pair of NAND gates connected to each respectively receive a different one of said second and third logic signals.

6. A data transmission system, comprising:

a work station;

an exchange network for enabling an operator to communicate from the work station to a remote data transmission system connected to the exchange network;

a primary information collection supervisory circuit connected to said exchange system, for collecting primary information from a local site;

a secondary information collection supervisory circuit including a main information module and a standby information module forming duplexed transmission paths each connected to said primary information collection supervisory circuit, for collecting secondary information in dependence upon said first information; and a tertiary information collection supervisory circuit including a main information module and a standby information module forming duplexed transmission paths each connected to said work station and respectively connected to said main information module and said standby information module of said secondary information collection supervisory circuit, for collecting tertiary information in dependence upon said secondary information and providing said tertiary information to said work station.

7. The data transmission system of claim 6, further comprising an optical fiber system and a multiplexer/demultiplexer connected in parallel to said primary information collection supervisory circuit and said exchange network.

8. The data transmission system of claim 6, further comprised of said secondary information collection supervisory circuit comprising:

said main information module containing first logic circuitry comprising a main/standby determining circuit and a first processor unit; and said standby information module containing second logic circuitry comprising a complementary main/standby determining circuit and a second processor unit for alternatively performing data transmission through alternate transmission paths of said main information module and said standby information module upon occurrence of a transmission error in any one of the duplexed transmission paths of said secondary information collection supervisory circuit.

9. The data transmission system of claim 8, further comprised of said main/stand-by determining circuit comprising:

a first inverter for providing a first inverted signal by inverting an output signal received from said complementary main/stand-by determining circuit;

a second inverter for providing a second inverted signal by inverting a control signal received from said first processor unit;

a first logic gate for generating a first logic signal by logically combining a compulsory switching signal received from said first processor unit, one of a main/ stand-by signal and a stand-by/main signal received from said complementary main/stand-by determining circuit, and a fault detection signal indicative of whether an error occurred in a transmission path;

a third inverter for providing a third inverted signal by inverting said first logic signal;

a second logic gate for generating a second logic signal by logically combining said output signal received from said complementary main/stand-by determining circuit and said third inverted signal;

a third logic gate for generating a third logic signal by logically combining said first inverted signal and said third inverted signal; and means coupled to receive said second and third logic signals, for generating a main/stand-by signal indicative of whether said main/stand-by determining circuit is in one of a main state where indicating that no error occurred in the transmission path and a standby state indicating that an error occurred in the transmission path.

10. The data transmission system of claim 9, further comprised of said first logic gate corresponding to a NAND gate, and said second and third logic gates each corresponding to an OR gate.

11. The data transmission system of claim 10, further comprise of said means for generating said main/stand-by signal comprising a pair of NAND gates connected to each respectively receive a different one of said second and third logic signals.

12. The data transmission system of claim 6, further comprised of said tertiary information collection supervisory circuit comprising:

said main information module containing first logic circuitry comprising a main/standby determining circuit and a first processor unit; and said standby information module containing second logic circuitry comprising a complementary main/standby determining circuit and a second processor unit for alternatively performing data transmission through alternate transmission paths of said main information module and said standby information module upon occurrence of a transmission error in any one of the duplexed transmission paths of said tertiary information collection supervisory circuit.

13. The data transmission system of claim 12, further comprised of said main/stand-by determining circuit comprising:

a first inverter for providing a first inverted signal by inverting an output signal received from said complementary main/stand-by determining circuit;

a second inverter for providing a second inverted signal by inverting a control signal received from said first processor unit;

a first logic gate for generating a first logic signal by logically combining a compulsory switching signal received from said first processor unit, one of a main/stand-by signal and a stand-by/main signal received from said complementary main/stand-by determining circuit, and a fault detection signal indicative of whether an error occurred in a transmission path;

a third inverter for providing a third inverted signal by inverting said first logic signal;

a second logic gate for generating a second logic signal by logically combining said output signal received from said complementary main/stand-by determining circuit and said third inverted signal;

a third logic gate for generating a third logic signal by logically combining said first inverted signal and said third inverted signal; and means coupled to receive said second and third logic signals, for generating a main/stand-by signal indicative of whether said main/stand-by determining circuit is in one of a main state indicating that no error occurred in the transmission path and a standby state indicating that an error occured in the transmission path.

14. The data transmission system of claim 13, further comprised of said first logic gate corresponding to a NAND gate, and said second and third logic gates each corresponding to an OR gate.

15. The data transmission system of claim 13, further comprised of said means for generating said main/stand-by signal comprising a path of NAND gates connected to each respectively receive a different one of said second and third logic signals.

* * * * *